(12) United States Patent
Takada et al.

(10) Patent No.: US 11,905,420 B2
(45) Date of Patent: Feb. 20, 2024

(54) TABULAR ALUMINA PARTICLES AND METHOD OF PRODUCING TABULAR ALUMINA PARTICLES

(71) Applicant: DIC Corporation, Tokyo (JP)

(72) Inventors: Shingo Takada, Sakura (JP); Hironobu Oki, Sakura (JP); Jian-Jun Yuan, Sakura (JP); Kazuo Itoya, Sakura (JP); Yoshiyuki Sano, Sakura (JP)

(73) Assignee: DIC Corporation, Tokyo (JP)

( * ) Notice: Subject to any disclaimer, the term of this patent is extended or adjusted under 35 U.S.C. 154(b) by 315 days.

(21) Appl. No.: 17/265,354

(22) PCT Filed: Aug. 9, 2019

(86) PCT No.: PCT/JP2019/031608
§ 371 (c)(1),
(2) Date: Feb. 2, 2021

(87) PCT Pub. No.: WO2020/036139
PCT Pub. Date: Feb. 20, 2020

(65) Prior Publication Data
US 2021/0301144 A1   Sep. 30, 2021

(30) Foreign Application Priority Data
Aug. 15, 2018   (JP) ................. 2018-152865

(51) Int. Cl.
*C09C 1/40*   (2006.01)
*C09C 3/06*   (2006.01)

(52) U.S. Cl.
CPC .............. *C09C 1/407* (2013.01); *C09C 3/063* (2013.01); *C01P 2002/85* (2013.01);
(Continued)

(58) Field of Classification Search
CPC .......... C01F 7/442; C01F 7/02; C01G 39/006; C01G 17/00; C01P 2002/54;
(Continued)

(56) References Cited

U.S. PATENT DOCUMENTS 6,015,456 A   1/2000   Fukuda et al.
6,197,277 B1   3/2001   Fukuda et al.
(Continued)

FOREIGN PATENT DOCUMENTS

JP   H09-59018 A   3/1997
JP   2002-249315 A   9/2002
(Continued)

OTHER PUBLICATIONS

International Search Report dated Nov. 5, 2019, issued for PCT/JP2019/031608.

*Primary Examiner* — Shuangyi Abu Ali
(74) *Attorney, Agent, or Firm* — Locke Lord LLP

(57) ABSTRACT

To provide plate-like alumina particles that are less likely to wear apparatuses. Plate-like alumina particles containing germanium or a germanium compound. The plate-like alumina particles preferably have a molar ratio of Ge to Al, [Ge]/[Al], of 0.08 or more as determined in an XPS analysis. The plate-like alumina particles preferably contain the germanium or germanium compound in a surface layer. The plate-like alumina particles preferably have a density of 3.7 $g/cm^3$ or more and 4.1 $g/cm^3$ or less. The plate-like alumina particles preferably have a molar ratio of Ge to Al, [Ge]/[Al], of 0.08 or less as determined in an XRF analysis.

8 Claims, 1 Drawing Sheet

Example 1

Example 2

Example 6

(52) U.S. Cl.
CPC ...... *C01P 2004/03* (2013.01); *C01P 2004/20* (2013.01); *C01P 2004/54* (2013.01); *C01P 2004/61* (2013.01); *C01P 2004/84* (2013.01); *C01P 2006/10* (2013.01)

(58) Field of Classification Search
CPC .............. C01P 2002/72; C01P 2002/85; C01P 2004/03; C01P 2004/20; C01P 2004/54; C01P 2004/61; C01P 2004/62; C01P 2004/84; C01P 2006/10; C01P 2006/40; C09C 1/407; C09C 3/063
See application file for complete search history.

(56) References Cited

U.S. PATENT DOCUMENTS

| | | |
|---|---|---|
| 7,067,157 B2 | 6/2006 | Fukuda et al. |
| 2001/0043910 A1 | 11/2001 | Fukuda et al. |
| 2010/0280261 A1* | 11/2010 | Howard ............... B01J 35/1076 568/672 |

FOREIGN PATENT DOCUMENTS

| | | |
|---|---|---|
| JP | 2003-192338 A | 7/2003 |
| JP | 2009-35430 A | 2/2009 |
| JP | 2016-222501 A | 12/2016 |

\* cited by examiner

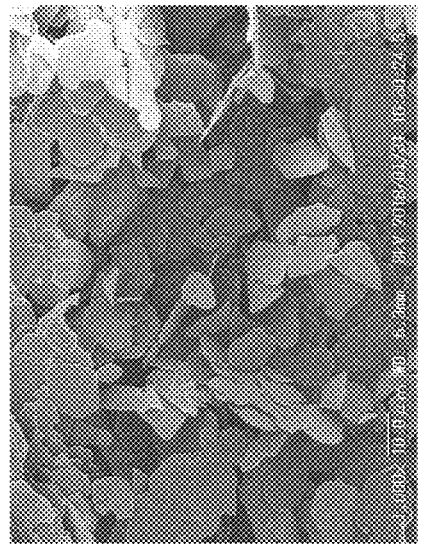
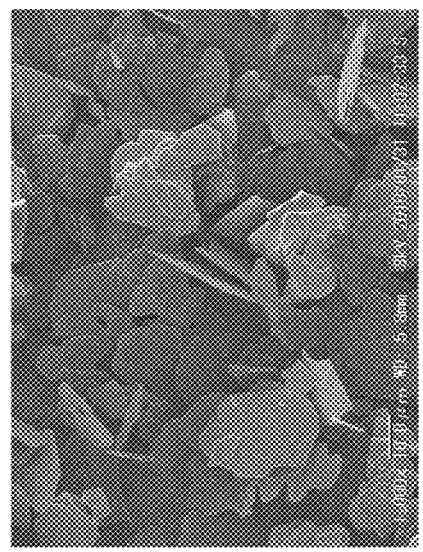

TABULAR ALUMINA PARTICLES AND METHOD OF PRODUCING TABULAR ALUMINA PARTICLES

TECHNICAL FIELD

The present invention relates to plate-like alumina particles and a method of producing plate-like alumina particles.

BACKGROUND ART

Alumina particles as an inorganic filler are used for various applications. Among them, plate-like alumina particles having a high aspect ratio are particularly superior in thermal characteristics, optical characteristics, and the like as compared to spherical alumina particles, and are required to be further improved in performance.

Conventionally, various plate-like alumina particles are known which are provided with features in the shape including the major axis and thickness for enhancing the above characteristics, dispersibility, and the like inherent in plate-like alumina particles (PTLs 1 to 2). In addition, as a production method for controlling the shape of plate-like alumina particles in order to achieve an increased aspect ratio thereof, a method of hydrothermal synthesis with a phosphorate compound added as a shape controlling agent (PTL 3) and a method of baking with a silicofluoride added (PTL 4) are known.

Furthermore, in another known method of producing plate-like alumina, silicon or a silicon compound containing silicon element is used as a crystal controlling agent in production of plate-like alumina (PTL 5).

CITATION LIST

Patent Literature

PTL 1: JP-A-2003-192338
PTL 2: JP-A-2002-249315
PTL 3: JP-A-9-59018
PTL 4: JP-A-2009-35430
PTL 5: JP-A-2016-222501

SUMMARY OF INVENTION

Technical Problem

However, these plate-like alumina particles may wear a mixer, a conveyer, a cutter, or the like due to the high hardness of alumina to possibly deteriorate or damage the apparatuses. Moreover, the frequency of contamination with the wear or crush fragments may increase.

The present invention has been made in view of the above circumstance, and has an object to provide plate-like alumina particles that are less likely to wear apparatuses than conventional plate-like alumina particles.

Solution to Problem

As a result of intensive and extensive studies for solving the above problem, the present inventors have made it possible to obtain plate-like alumina particles containing germanium or a germanium compound which has lower hardness than alumina, thus completing the present invention. Specifically, the present invention relates to the following (1) to (10).

(1) Plate-like alumina particles containing germanium or a germanium compound.
(2) The plate-like alumina particles according to (1), wherein the plate-like alumina particles have a molar ratio of Ge to Al, [Ge]/[Al], of 0.08 or more as determined in an XPS analysis.
(3) The plate-like alumina particles according to (1) or (2), wherein the plate-like alumina particles contain the germanium or germanium compound in a surface layer.
(4) The plate-like alumina particles according to any one of (1) to (3), wherein the plate-like alumina particles have a density of 3.7 g/cm$^3$ or more and 4.1 g/cm$^3$ or less.
(5) The plate-like alumina particles according to any one of (1) to (4), wherein the plate-like alumina particles have a molar ratio of Ge to Al, [Ge]/[Al], of 0.08 or less as determined in an XRF analysis.
(6) The plate-like alumina particles according to any one of claims 1 to 5, wherein the plate-like alumina particles have a thickness of 0.01 to 5 μm, a mean particle size of 0.1 to 500 μm, and an aspect ratio or 2 to 500.
(7) The plate-like alumina particles according to any one of (1) to (6), wherein the plate-like alumina particles further contain molybdenum.
(8) The plate-like alumina particles according to any one of (1) to (7), wherein the plate-like alumina particles have a pH of 2 to 6 at an isoelectric point which gives a potential of zero in a zeta potential measurement.
(9) A method of producing the plate-like alumina particles according to any one of (1) to (8), the method including mixing a molybdenum compound, a raw material germanium compound, and an aluminum compound to prepare a mixture, and baking the mixture.
(10) The method of producing the plate-like alumina particles according to (9), wherein the mixture further contains a potassium compound.

Advantageous Effects of Invention

According to the present invention, plate-like alumina particles that are less likely to wear apparatuses than conventional plate-like alumina particles can be provided by incorporating germanium or a germanium compound.

BRIEF DESCRIPTION OF DRAWINGS

FIG. 1 shows SEM images of plate-like alumina particles obtained in Examples.

DESCRIPTION OF EMBODIMENTS

Plate-like alumina particles according to an embodiment of the present invention and a method of producing plate-like alumina particles will be described in detail below.

<Plate-Like Alumina Particles>

The plate-like alumina particles according to the embodiment contain germanium or a germanium compound. In addition, the plate-like alumina particles may contain molybdenum. The plate-like alumina particles may further contain an impurity derived from a raw material, a shape controlling agent, or the like as long as the effect of the present invention is not impaired. Note that the plate-like alumina particles may further contain an organic compound or the like.

The plate-like alumina particles according to the embodiment are less likely to wear apparatuses than conventional plate-like alumina particles due to the germanium or germanium compound incorporated. Alumina is a substance having a Mohs' hardness of 9 and is classified as a very hard substance. Thus, conventional plate-like alumina particles have had a problem of wearing apparatuses that are used for production or the like of a product containing the plate-like alumina particles. On the other hand, germanium or a germanium compound has a lower Mohs' hardness, for example, germanium dioxide ($GeO_2$) has a Mohs' hardness of about 6. Accordingly, the plate-like alumina particles according to the embodiment, which contain germanium or a germanium compound, can reduce the wear of apparatuses. Furthermore, when the plate-like alumina particles according to the embodiment contain germanium or a germanium compound in a surface layer, an apparatus comes in contact with the germanium or germanium compound on the surface instead of the alumina in the plate-like alumina particles, making it possible to reduce the wear of the apparatus more.

In addition, when the plate-like alumina particles contain molybdenum and the content and the state of existence thereof are controlled in the production method described later, the physical properties and performance, for example, the optical characteristics, such as the hue and transparency, of plate-like alumina can be adjusted at will according to the use purpose.

The "plate-like", as used herein, means that the aspect ratio determined by dividing the mean particle size of alumina particles by the thickness thereof is 2 or more. Note that the "thickness of alumina particles", as used herein, refers to an arithmetic mean value of thicknesses measured for at least 50 plate-like alumina particles randomly selected in an image taken with a scanning electron microscope (SEM). In addition, the "mean particle size of alumina particles" refers to a volume-based median diameter d50 calculated based on a volume-based cumulative particle size distribution measured with a laser diffraction and scattering particle size distribution analyzer.

In the alumina particles of the present invention, the conditions, such as the thickness, mean particle size, and aspect ratio, can be combined in any way to the extent that the particles are plate-like.

The plate-like alumina particles according to the embodiment preferably have a thickness of 0.01 to 5 μm, preferably have a mean particle size of 0.1 to 500 μm, and preferably have an aspect ratio which is the ratio of the particle size to the thickness of 2 to 500. Plate-like alumina particles having an aspect ratio of 2 or more are preferred since such plate-like alumina particles can have two-dimensional formulation characteristics, and plate-like alumina particles having an aspect ratio of 500 or less are preferred since such plate-like alumina particles are superior in the mechanical strength. The thickness is more preferably 0.03 to 2 μm, the mean particle size is more preferably 0.5 to 100 μm, and the aspect ratio which is the ratio of the particle size to the thickness is more preferably 10 to 300. An aspect ratio of 10 to 300 is preferred since such alumina particles result in a high luminance pigment. The thickness is further preferably 0.1 to 1 μm, the mean particle size is further preferably 1 to 50 μm, and the aspect ratio which is the ratio of the particle size to the thickness is further preferably 17 to 100.

The plate-like alumina particles according to the embodiment may be circular plate-like or elliptical plate-like, but the shape of the particles is preferably polygonal, for example, hexagonal to octagonal, plate-like in terms of handleability or easy production.

The thickness, mean particle size, aspect ratio, and the like of the plate-like alumina particles according to the embodiment can be controlled by selecting the ratio of a molybdenum compound, an aluminum compound, and a shape controlling agent used, the type of the shape controlling agent, and the state of existence of the shape controlling agent and the aluminum compound.

The plate-like alumina particles according to the embodiment may be obtained according to any production method as long as germanium or a germanium compound is contained, but preferably the plate-like alumina particles are obtained by baking an aluminum compound in the presence of a molybdenum compound and a shape controlling agent in terms of a higher aspect ratio, more superior dispersibility, and more superior productivity. A germanium compound (raw material germanium compound) containing germanium element is preferably used as the shape controlling agent since such compound acts as a Ge source for the germanium or germanium compound contained in the plate-like alumina particles.

In the production method, the molybdenum compound is used as a flux agent. Such a production method using a molybdenum compound as a flux agent is hereinbelow sometimes referred to as simply a "flux method". The flux method will be described later. Note that it is considered that the molybdenum compound is taken in the plate-like alumina particles by the baking while the molybdenum compound is reacted with the aluminum compound at a high temperature to form aluminum molybdate and then the aluminum molybdate is decomposed into alumina and molybdenum oxide at a higher temperature. It is also possible that molybdenum oxide which is sublimed is collected and reused. It is then considered that, in this course, the raw material germanium compound incorporated as the shape controlling agent is reacted with the aluminum compound via molybdenum, and thus the germanium or germanium compound is formed in a surface layer of the plate-like alumina particles. The mechanism of production of the germanium or germanium compound contained in the plate-like alumina particles in more detail is believed as follows: on the surface of the plate-like alumina, molybdenum and a Ge atom are reacted to form Mo—O—Ge and molybdenum and an Al atom are reacted to form Mo—O—Al, and while Mo is eliminated by baking at a high temperature, germanium, a germanium-containing oxide, a Ge—O—Al bond-containing compound, or the like is formed in the surface layer of the plate-like alumina.

Molybdenum oxide that is not taken in the plate-like alumina particles is preferably collected by sublimation and reused. By this operation, the amount of molybdenum oxide deposited on the surface of the plate-like alumina can be reduced, and in dispersion in a dispersion medium, for example, an organic binder, such as a resin, or an inorganic binder, such as glass, the molybdenum oxide is not mixed in the binder, making it possible to impart the properties inherent in the plate-like alumina as much as possible.

Note that, in the present invention, a compound that has a capability of sublimation in the production method described later is referred to as a flux agent and a compound that does not have such a capability of sublimation is referred to as a shape controlling agent.

In production of the plate-like alumina particles, the alumina particles have a high alpha crystallization ratio and have a euhedral shape by utilizing molybdenum and the shape controlling agent, whereby the alumina particles can achieve superior dispersibility and mechanical strength and high thermal conductivity.

The amount of the germanium or germanium compound produced in the plate-like alumina particles can be controlled by the proportions of the molybdenum compound and the shape controlling agent used, and in particular, can be controlled by the proportion of the raw material germanium compound which is used as the shape controlling agent. A preferred value of the amount of the germanium or germanium compound produced in the plate-like alumina particles and a preferred value of the proportions of the raw materials used will be described in detail later.

By incorporating germanium or a germanium compound in the plate-like alumina particles according to the embodiment, the pH at the isoelectric point which gives a potential of zero in a zeta potential measurement is shifted to the acidic side as compared with a typical alumina.

The pH at the isoelectric point of the plate-like alumina particles is, for example, in the range of 2 to 6, preferably in the range of 2.5 to 5, and more preferably in the range of 2.9 to 4. Plate-like alumina particles having a pH at the isoelectric point within the above range have high electrostatic repulsion. Thus, such plate-like alumina particles can increase the dispersion stability by themselves when blended into such a dispersion medium as described above and can be more easily modified by a surface treatment with a coupling treatment agent or the like intended to further enhance the performance.

Germanium or a germanium compound has a higher density than alumina. It is thus considered that, as the amount of the germanium or germanium compound in the plate-like alumina particles increases, the density of the plate-like alumina particles increases.

The plate-like alumina particles according to the embodiment have a density of, for example, 3.7 g/cm$^3$ or more and 4.1 g/cm$^3$ or less, preferably have a density of 3.9 g/cm$^3$ or more and 4.1 g/cm$^3$ or less, and more preferably have a density of 4.0 g/cm$^3$ or more and 4.1 g/cm$^3$ or less.

In plate-like alumina particles having a density in the above range, the amount of the germanium or germanium compound contained is suitable so that the plate-like shape is formed well, the quality is superior, and the effect of reducing the wear of apparatuses is even superior.

The density is measured under the same conditions as the measurement conditions described later in Examples or under conditions compatible thereto that provide the same measurement results.

[Alumina]

The "alumina" contained in the plate-like alumina particles according to the embodiment is aluminum oxide, and may be, for example, a transition alumina having various crystal forms, such as γ, δ, θ, κ, and δ. In addition, alumina hydrate may be contained in a transition alumina. In terms of superior mechanical strength or thermal conductivity, the alumina preferably basically has the α crystal form (α-type). The α crystal form is a dense crystal structure of alumina and is advantageous for increasing the mechanical strength or thermal conductivity of the plate-like alumina of the present invention.

The alpha crystallization ratio is preferably as close as possible to 100% since the properties inherent in the α crystal form can be easily exhibited. The plate-like alumina particles according to the embodiment have an alpha crystallization ratio of, for example, 90% or more, preferably 95% or more, and more preferably 99% or more.

[Germanium or Germanium Compound]

The "germanium or germanium compound" contained in the plate-like alumina particles according to the embodiment is not particularly limited as long as it is a substance containing Ge. Depending on the raw material used, the plate-like alumina particles according to the embodiment may contain, as germanium or a germanium compound, for example, at least one selected from the group consisting of compounds, such as Ge, $GeO_2$, GeO, $GeCl_2$, $GeBr_4$, $GeI_4$, $GeS_2$, AlGe, GeTe, $GeTe_3$, $As_2$, GeSe, $GeS_3As$, SiGe, $Li_2Ge$, FeGe, SrGe, and GaGe, and oxides and the like thereof. The substance may be contained in a surface layer. Note that, in Examples described later, an XRD peak strength is observed for alumina particles containing $GeO_2$.

Note that the "germanium or germanium compound" contained in the plate-like alumina particles according to the embodiment and the "raw material germanium compound" used as the shape controlling agent which is a raw material may be the same germanium compound. In Examples described later, $GeO_2$ is added as a raw material, whereby $GeO_2$ is detected in the plate-like alumina particles produced.

The germanium or germanium compound, which is contained in a surface layer of the plate-like alumina particles, provides a significant reduction in wear of apparatuses in the present invention. Here, the "surface layer" means a portion within 10 nm from the surface of the plate-like alumina particles according to the embodiment. The distance corresponds to the depth of detection in XPS used for measurement in Examples. Note that the surface layer containing germanium is a very thin layer within 10 nm, and in the case of, for example, germanium dioxide, when there are many defects or the like in the germanium dioxide structure in the surface and interface, the hardness of the germanium dioxide is further lower than the original Mohs' hardness (6.0), and thus the wear of apparatuses can be reduced more significantly as compared with germanium dioxide that has no or less structure defects.

In the plate-like alumina particles according to the embodiment, the germanium or germanium compound is preferably distributed more in the surface layer. As used herein, the "distributed more in the surface layer" means the state in which the mass of the germanium or germanium compound per unit volume in the surface layer is larger than the mass of the germanium or germanium compound per unit volume in the portion other than the surface layer. The state in which the germanium or germanium compound is distributed more in the surface layer can be determined by comparing a result of a surface analysis by XPS with a result of an analysis of the entire particles by XRF, as described in Examples later. With the germanium or germanium compound distributed more in the surface layer, the same level of the reduction in wear of apparatuses based on the germanium or germanium compound can be achieved with a smaller amount as compared with the case where the germanium or germanium compound exists not only in the surface layer but also in the portion other than the surface layer (inner layer).

Since the plate-like alumina particles according to the embodiment contain germanium or a germanium compound in the surface layer, Ge is detected by an XPS analysis. The plate-like alumina particles according to the embodiment preferably have a value of molar ratio of Ge to Al, [Ge]/[Al], as determined in the XPS analysis of 0.08 or more, more preferably 0.1 or more, further preferably 0.12 or more, and particularly preferably 0.13 or more. According to the results of XPS in Examples described later, the value of [Ge]/[Al] increases by increasing the amount of the raw material $GeO_2$ charged, but the value reaches a plateau at a certain level. This is considered to mean that the amount of Ge in the plate-like alumina particles is saturated. Accordingly, plate-like alumina particles having a value of molar ratio [Ge]/[Al] of 0.12 or more, particularly 0.13 or more are considered to be in the state where the surface is coated with the germanium or germanium compound. The coated state may be the state where the entire surface of the plate-like alumina particles is coated with the germanium or germanium compound or may be the state where at least a part of the surface of the plate-like alumina particles is coated with the germanium or germanium compound.

The upper limit of the value of molar ratio [Ge]/[Al] in the XPS analysis is not particularly limited, but is preferably 0.3 or less, more preferably 0.25 or less, further preferably 0.2 or less, and particularly preferably 0.17 or less.

The plate-like alumina particles according to the embodiment preferably have a value of molar ratio of Ge to Al, [Ge]/[Al], as determined in an XPS analysis, of 0.08 or more and 0.3 or less, more preferably 0.1 or more and 0.25 or less, further preferably 0.12 or more and 0.2 or less, and particularly preferably 0.13 or more and 0.17 or less.

Plate-like alumina particles having a value of molar ratio [Ge]/[Al] as determined in an XPS analysis in the above range have an appropriate amount of the germanium or germanium compound contained in the surface layer so that the plate-like shape is formed well, the quality is superior, and the effect of reducing wear of apparatuses is even superior.

The XPS analysis is conducted under the same conditions as the measurement conditions described later in Examples or under conditions compatible thereto that provide the same measurement results.

In this embodiment, in a method of producing plate-like alumina as described later, a raw material germanium compound, such as $GeO_2$, charged as a shape controlling agent is formed at a high efficiency into a layer that contains germanium in the surface layer of the plate-like alumina, whereby a plate-like alumina having a superior quality can be obtained.

Since the plate-like alumina particles according to the embodiment contain germanium or a germanium compound, Ge is detected by an XRF analysis. The plate-like alumina particles according to the embodiment have a molar ratio of Ge to Al, [Ge]/[Al], as determined in an XRF analysis of, for example, 0.08 or less, preferably 0.05 or less, and more preferably 0.03 or less.

In addition, the value of molar ratio, [Ge]/[Al], is not particularly limited, but, for example, is 0.005 or more, preferably 0.01 or more, and more preferably 0.015 or more.

The plate-like alumina particles according to the embodiment have a molar ratio of Ge to Al, [Ge]/[Al], as determined in an XRF analysis of, for example, 0.005 or more and 0.08 or less, preferably 0.01 or more and 0.05 or less, and more preferably 0.015 or more and 0.03 or less.

Plate-like alumina particles having a value of molar ratio, [Ge]/[Al], as determined in the XRF analysis in the above range contain an appropriated amount of the germanium or germanium compound so that the plate-like shape is formed well, the quality is superior, and the effect of reducing wear of apparatuses is even superior.

The plate-like alumina particles according to the embodiment contain germanium corresponding to the raw material germanium compound used in the production method thereof. The germanium content relative to 100% by mass of the plate-like alumina particles according to the embodiment is, in terms of germanium dioxide, preferably 10% by mass or less, more preferably 0.001 to 5% by mass, further preferably 0.01 to 4% by mass or less, and particularly preferably 0.6 to 3.0% by mass or less. A germanium content in the above range is preferred since the amount of the germanium or germanium compound is suitable. The germanium content can be determined by an XRF analysis.

The XRF analysis is conducted under the same conditions as the measurement conditions described later in Examples or under conditions compatible thereto that provide the same measurement results.

In addition, the germanium or germanium compound in the surface layer may from a layer, and the germanium or germanium compound and the alumina may be mixed therein. At the interface between the germanium or germanium compound and the alumina in the surface layer, the germanium or germanium compound and the alumina may be in physical contact with each other, or the germanium or germanium compound and the alumina may form a chemical bond, such as Ge—O—Al.

[Molybdenum]

In addition, the plate-like alumina particles according to the embodiment may contain molybdenum. The molybdenum is derived from the molybdenum compound used as a flux agent.

Molybdenum has a catalytic function and an optical function. In addition, by utilizing molybdenum, the formation of the germanium or germanium compound is promoted in the production method as described later, and plate-like alumina particles having a high aspect ratio and superior dispersibility can be produced. In addition, by utilizing the characteristics of molybdenum contained in the plate-like alumina particles, the plate-like alumina particles can be applied to the use as an oxidation reaction catalyst or an optical material.

The molybdenum is not particularly limited, and includes metallic molybdenum, molybdenum oxide, and a molybdenum compound that is partially reduced. Molybdenum is considered to be contained as $MoO_3$ in the plate-like alumina particles, but besides $MoO_3$, molybdenum may be contained as $MoO_2$, MoO, or the like in the plate-like alumina particles.

The form of molybdenum contained is not particularly limited, and molybdenum may be contained in the form of deposition on the surface of the plate-like alumina particles, may be contained in the form where a part of aluminum in the crystal structure of alumina is substituted therewith, or may be the mixture of the above forms.

The molybdenum content relative to 100% by mass of the plate-like alumina particles according to the embodiment is, in terms of molybdenum trioxide, preferably 10% by mass or less. By adjusting the temperature or time period of baking, or the rate of sublimation of the molybdenum compound, the content is preferably 0.001 to 5% by mass, further preferably 0.01 to 5% by mass, and particularly preferably 0.1 to 1.5% by mass. A molybdenum content of 10% by mass or less is preferred since the quality of the α single crystal of alumina can then be increased.

The molybdenum content can be determined by an XRF analysis. The XRF analysis is conducted under the same conditions as the measurement conditions described later in Examples or under conditions compatible thereto that provide the same measurement results.

[Organic Compound]

In an embodiment, the plate-like alumina particles may contain an organic compound. The organic compound is present on the surface of the plate-like alumina particles and has a function of adjusting the physical properties of the surface of the plate-like alumina particles. For example, since plate-like alumina particles containing an organic compound on the surface thereof is increased in affinity to resins, such plate-like alumina particles can exhibit its function as a filler as much as possible.

The organic compound is not particularly limited, and examples thereof include an organic silane, an alkyl phosphonic acid, and a polymer.

Examples of the organic silane include an alkyltrimethoxysilane or alkyltrichlorosilane in which the alkyl group has 1 to 22 carbon atoms, such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, or hexyltrimethoxysilane, 3,3,3-trifluoropropyltrimethoxysilane, tridecafluoro-1,1,2,2-tetrahydrooctyl)trichlorosilane, phenyltrimethoxysilane, phenyltriethoxysilane, p-chloromethylphenyltrimethoxysilane, and p-chloromethylphenyltriethoxysilane.

Examples of the phosphonic acid include methylphosphonic acid, ethylphosphonic acid, propylphosphonic acid, butylphosphonic acid, pentylphosphonic acid, hexylphosphonic acid, heptylphosphonic acid, octylphosphonic acid, decylphosphonic acid, dodecylphosphonic acid, octadecylphosphonic acid, 2-ethylhexylphosphonic acid, cyclohexylmethylphosphonic acid, cyclohexylethylphosphonic acid, benzylphosphonic acid, phenylphosphonic acid, and dodecylbenzene phosphonic acid.

As the polymer, for example, a poly(meth)acrylate can be suitably used. Specific examples thereof include poly(methyl (meth)acrylate), poly(ethyl (meth)acrylate), poly(butyl (meth)acrylate), poly(benzyl (meth)acrylate), poly(cyclohexyl (meth) acrylate), poly(t-butyl (meth)acrylate), poly (glycidyl (meth)acrylate), and poly(pentafluoropropyl (meth)acrylate). Examples also include polymers, such as general polystyrene, polyvinyl chloride, polyvinyl acetate, an epoxy resin, polyester, polyimide, and polycarbonate.

Note that one of the organic compounds may be contained alone or two or more thereof may be contained.

The form of the organic compound contained is not particularly limited, and the organic compound may be bound to the alumina via a covalent bond or the alumina may be coated with the organic compound.

The content of the organic compound based on the mass of the plate-like alumina particles is preferably 20% by mass or less, further preferably 10 to 0.01% by mass. A content of the organic compound of 20% by mass or less is preferred since the physical properties due to the plate-like alumina particles can be easily exhibited.

<Method of Producing Plate-Like Alumina Particles>

The method of producing plate-like alumina particles is not particularly limited and a known technique may be appropriately applied. From the viewpoint of suitably controlling the alumina having a high alpha crystallization ratio at a relatively lower temperature, a production method according to a flux method utilizing a molybdenum compound is preferably applied.

More specifically, a preferred method of producing plate-like alumina particles includes a step (baking step) of baking an aluminum compound in the presence of a molybdenum compound and a shape controlling agent. The baking step may be a step of baking a mixture obtained by a step (mixing step) of obtaining a mixture to be baked.

[Mixing Step]

The mixing step is a step of mixing an aluminum compound, a molybdenum compound, and a shape controlling agent to prepare a mixture. The components of the mixture will be described below.

(Aluminum Compound)

The aluminum compound in the present invention contains aluminum element and is a raw material of the plate-like alumina particles according to the embodiment. The aluminum compound is not particularly limited as long as it is converted to an alumina by a heat treatment and, for example, aluminum chloride, aluminum sulfate, basic aluminum acetate, aluminum hydroxide, boehmite, pseudoboehmite, transition alumina (γ-alumina, δ-alumina, θ-alumina, etc.), α-alumina, a mixed alumina having two or more crystal phases, and the like can be used. The physical forms, such as the shape, particle size, specific surface area, and the like of the aluminum compound as a precursor are not particularly limited.

According to the flux method described in detail below, any shape of the plate-like alumina particles according to the embodiment, such as a spherical shape, an amorphous shape, a structure having an aspect ratio (wire, fiber, ribbon, tube, etc.), or a sheet, can be suitably used.

Similarly, regarding the particle size of the aluminum compound, according to the flux method described in detail below, a solid of an aluminum compound having any size in the range of several nanometers to 13 μm can be suitably used according to the target application, size, and the like of the plate-like alumina particles to be obtained.

The specific surface area of the aluminum compound is not particularly limited. Since the molybdenum compound effectively acts, a larger specific surface area is preferred, but by adjusting the conditions in baking and the amount of the molybdenum compound used, an aluminum compound having any specific surface area can be used as a raw material.

In addition, the aluminum compound may be composed only of an aluminum compound or may be a composite of an aluminum compound and an organic compound. For example, an organic/inorganic composite obtained by modifying an aluminum compound with an organic silane, an aluminum compound composite with a polymer adsorbed, and the like can be suitably used. When such a composite is used, the content of the organic compound is not particularly limited, but the content is preferably 60% by mass or less, and more preferably 30% by mass or less since plate-like alumina particles can then be efficiently produced.

(Shape Controlling Agent)

A shape controlling agent can be used for forming the plate-like alumina particles according to the embodiment. The shape controlling agent plays an important role in growth of the plate-like crystal of alumina through baking of the alumina compound in the presence of the molybdenum compound.

The state of existence of the shape controlling agent is not particularly limited, and, for example, a physical mixture of the shape controlling agent and the aluminum compound or a composite in which the shape controlling agent is evenly or unevenly present in the surface or interior of the aluminum compound can be suitably used.

In addition, the shape controlling agent may be added to the aluminum compound, but may be contained as an impurity in the aluminum compound.

The shape controlling agent has an important role in growth of the plate-like crystal. In a general molybdenum oxide flux method, molybdenum oxide is selectively adsorbed on the (113) plane of the α crystal of alumina to make it difficult to supply the crystal component to the (113) plane so that the emersion of the (001) plane or the (006) plane can be completely suppressed, resulting in the formation of polyhedron particles based on a hexagonal dipyramid. In a production method of the embodiment, while using the shape controlling agent, molybdenum oxide as a flux agent suppresses the selective adsorption of the crystal component on the (113) plane, which makes it possible to form a plate-like form having a dense hexagonal lattice crystal structure in which the (001) plane is developed and which is the most stable in terms of the thermodynamics. By using a molybdenum compound as a flux agent, plate-like alumina particles containing molybdenum having a high alpha crystallization ratio can be formed more easily.

Regarding the type of the shape controlling agent, a germanium compound containing germanium element (raw material germanium compound) is preferably used in that the raw material germanium compound is a Ge source for the germanium or germanium compound contained in the plate-like alumina particles. In addition, a germanium compound (raw material germanium compound) is preferably used in that plate-like alumina particles having a higher aspect ratio, even superior dispersibility, and even superior productivity can be produced. By using a germanium compound as the shape controlling agent, plate-like alumina particles having a higher aspect ratio can be produced than in the case where silicon or a silicon compound is used as the shape controlling agent.

According to the flux method in which a raw material germanium compound is used as the shape controlling agent, plate-like alumina particles containing germanium or a germanium compound can be easily produced.

The raw material germanium compound used as the shape controlling agent is not particularly limited, and a known germanium compound can be used. Specific examples of the raw material germanium compound include metallic germanium, germanium dioxide, germanium monoxide, germanium tetrachloride, and an organic germanium compound having a Ge—C bond. Note that one of the raw material germanium compounds may be used alone or two or more thereof may be used in combination. In addition, the raw material germanium compound may be used in combination with another shape controlling agent as long as the effect of the present invention is not impaired.

The shape of the raw material germanium compound is not particularly limited, and, for example, a spherical shape, an amorphous shape, and a structure having an aspect ratio (wire, fiber, ribbon, tube, etc.), and a sheet can be suitably used.

(Potassium Compound)

A potassium compound can further be used as a shape controlling agent in combination with the raw material germanium compound.

The potassium compound is not particularly limited, and examples thereof include potassium chloride, potassium chlorite, potassium chlorate, potassium sulfate, potassium hydrogen sulfate, potassium sulfite, potassium hydrogen sulfite, potassium nitrate, potassium carbonate, potassium hydrogen carbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, and potassium tungstate. In this case, the potassium compound includes the isomers as in the case of the molybdenum compound. Among them, potassium carbonate, potassium hydrogen carbonate, potassium oxide, potassium hydroxide, potassium chloride, potassium sulfate, or potassium molybdate is preferably used, and potassium carbonate, potassium hydrogen carbonate, potassium chloride, potassium sulfate, or potassium molybdate is more preferably used. Note that one of the potassium compounds may be used alone or two or more thereof may be used in combination. In addition, potassium molybdate, which contains molybdenum, can also have the above-mentioned function as the molybdenum compound.

The potassium compound greatly contributes to the efficient formation of a layer containing germanium in the alumina surface layer.

(Molybdenum Compound)

The molybdenum compound contains molybdenum element, and has a flux function for growth of the α crystal of alumina at a relatively lower temperature as described later.

The molybdenum compound is not particularly limited, and examples thereof include molybdenum oxide and a compound containing an acid radical anion ($MoO_x^{n-}$) in which metallic molybdenum is bound to oxygen.

The compound containing an acid radical anion ($MoO_x^{n-}$) is not particularly limited, and examples thereof include molybdic acid, sodium molybdate, potassium molybdate, lithium molybdate, $H_3PMo_{12}O_{40}$, $H_3SiMo_{12}O_{40}$, $NH_4Mo_7O_{12}$, and molybdenum disulfide.

The molybdenum compound can contain silicon. In this case, the molybdenum compound containing silicon plays both the roles of the flux agent and the shape controlling agent.

Among the molybdenum compounds, molybdenum oxide is preferably used from the viewpoints of the easy sublimation and the cost. In addition, one of the above molybdenum compounds may be used alone or two or more thereof may be used in combination.

The amounts of the aluminum compound, the molybdenum compound, and the raw material germanium compound used are not particularly limited. Preferably, relative to 100% by mass of the plate-like alumina particles, 50% by mass or more of the aluminum compound in terms of $Al_2O_3$, 40% by mass or less of the molybdenum compound in terms of $MoO_3$, and 0.5% by mass or more and less than 10% by mass of the raw material germanium compound in terms of $GeO_2$ can be mixed to prepare a mixture, followed by baking the mixture. More preferably, relative to 100% by mass of the plate-like alumina particles, 70% by mass or more and 99% by mass or less of the aluminum compound in terms of $Al_2O_3$, 0.5% by mass or more and 30% by mass or less of the molybdenum compound in terms of $MoO_3$, and 1% by mass or more and 7% by mass or less of the raw material germanium compound in terms of $GeO_2$ may be mixed to prepare a mixture, followed by baking the mixture. Further preferably, relative to 100% by mass of the plate-like alumina particles, 80% by mass or more and 94.5% by mass or less of the aluminum compound in terms of $Al_2O_3$, 1% by mass or more and 7% by mass or less of the molybdenum compound in terms of $MoO_3$, and 1.5% by mass or more and 5% by mass or less of the raw material germanium compound in terms of $GeO_2$ may be mixed to prepare a mixture, followed by baking the mixture.

When the compounds are used in the above ranges, the amount of the germanium or germanium compound contained in the resulting plate-like alumina particles is a more appropriate value so that the plate-like shape is formed well and plate-like alumina particles having a thickness of 0.01 to 5 μm, a mean particle size of 0.1 to 500 μm, and an aspect ratio which is the ratio of the particle size to the thickness of 2 to 500 can be produced.

When the mixture further contains the potassium compound described above, the amount of the potassium compound used is not particularly limited, but preferably the potassium compound of 5% by mass or less in terms of $K_2O$ relative to 100% by mass of the plate-like alumina particles can be mixed. More preferably, the potassium compound of 0.01% by mass or more and 3% by mass or less in terms of $K_2O$ relative to 100% by mass of the plate-like alumina particles can be mixed. Further preferably, a potassium compound of 0.05% by mass or more and 1% by mass or less in terms of $K_2O$ relative to 100% by mass of the plate-like alumina particles can be mixed.

By using the potassium compound, potassium molybdate formed by a reaction with the molybdenum compound is considered to have an effect of distributing the raw material germanium and to contribute to the promotion of formation of the germanium or germanium compound on the surface of the plate-like alumina particles. As the potassium compound that is used in charging the raw materials or that is produced in a reaction in the course of increasing the temperature for baking, a water soluble potassium compound, for example, potassium molybdate is not vaporized in the baking temperature range but can be easily collected by washing after baking. Accordingly, the amount of the molybdenum compound released out of the baking furnace is reduced and the production cost can be considerably reduced.

The aluminum compound, molybdenum compound, raw material germanium compound, and potassium compound described above are used in such amounts that the total of the amounts used in terms of the respective oxides does not exceed 100% by mass.

[Baking Step]

The baking step may be a step of baking the aluminum compound in the presence of the molybdenum compound and the shape controlling agent. The baking step may be a step of baking the mixture obtained in the mixing step. That is, the baking step may include mixing the molybdenum compound, the raw material germanium compound, and the aluminum compound to prepare a mixture, and baking the mixture.

The plate-like alumina particles according to the embodiment are obtained, for example, by baking the aluminum compound in the presence of the molybdenum compound and the shape controlling agent. As described above, the production method is called a flux method.

The flux method is classified as a solution method. The flux method is, more specifically, a method of growing crystals in which a fact that a phase diagram of a crystal-flux binary system is of a eutectic type is used. The mechanism of the flux method is presumed as follows. That is, when a mixture of a solute and a flux is heated, the solute and the flux form a liquid phase. Here, since the flux is a fusing agent, in other words, since the phase diagram of a solute-flux binary system is of a eutectic type, the solute is molten at a temperature lower than its melting point to constitute a liquid phase. When the flux is vaporized in this state, the concentration of the flux is reduced, in other words, the effect of decreasing the melting point of the solute by the flux is reduced, the crystal growth of the solute occurs with the vaporization of the flux as a driving force (flux vaporization method). Note that the crystal growth of the solute can be caused also by cooling the liquid phase of the solute and the flux (gradual cooling method).

The flux method has advantages in that the crystal growth can be induced at a temperature much lower than the melting point, that the crystal structure can be precisely controlled, and that a euhedral polyhedron crystal can be formed, for example.

In production of α-alumina particles by a flux method using a molybdenum compound as a flux, the mechanism is not entirely clear, but the mechanism is presumed, for example, as follows. That is, when an aluminum compound is baked in the presence of a molybdenum compound, aluminum molybdate is formed first. Here, the aluminum molybdate causes the growth of the α-alumina crystal at a temperature lower than the melting point of the alumina as can be understood by the above description. Then, for example, by vaporizing the flux, aluminum molybdate is decomposed and the crystals are grown, whereby the α-alumina particles can be obtained. In other words, the molybdenum compound functions as a flux, and α-alumina particles are produced via aluminum molybdate as an intermediate.

In production of α-alumina particles by the flux method in the case of further using a potassium compound as the shape controlling agent, the mechanism is not entirely clear, but is presumed, for example, as follows. A molybdenum compound and an aluminum compound are first reacted to form aluminum molybdate. Then, for example, aluminum molybdate is decomposed into molybdenum oxide and alumina, and at the same time, a molybdenum compound containing molybdenum oxide obtained by the decomposition is reacted with the potassium compound to form potassium molybdate. Crystals of alumina grow in the presence of the molybdenum compound containing potassium molybdate, whereby the plate-like alumina particles according to the embodiment can be obtained.

According to the flux method, plate-like alumina particles that contains germanium or a germanium compound in a surface layer and that has a particle shape of polygonal plate with a thickness of 0.01 to 5 μm, a mean particle size of 0.1 to 500 μm, and an aspect ratio which is the ratio of the particle size to the thickness of 2 to 500 can be produced.

The method of baking is not particularly limited, and can be a known common method. When the baking temperature exceeds 700° C., the aluminum compound and the molybdenum compound are reacted to form aluminum molybdate. Furthermore, when the baking temperature is 900° C. or higher, the aluminum molybdate is decomposed to form plate-like alumina particles by an action of the shape controlling agent. In addition, in the plate-like alumina particles, it is considered that the molybdenum compound is taken in the aluminum oxide particles while the aluminum molybdate is decomposed into alumina and molybdenum oxide.

It is also considered that, when the baking temperature is 900° C. or higher, a molybdenum compound (for example, molybdenum trioxide) obtained by decomposition of aluminum molybdate is reacted with the potassium compound to form potassium molybdate.

It is further considered that, when the baking temperature is 1000° C. or higher, while crystals of the plate-like alumina particles grow in the presence of molybdenum, $Al_2O_3$ and the Ge compound on the surface of the plate-like alumina particles are reacted to form germanium dioxide, a compound having Ge—O—Al, and the like at a high efficiency.

In addition, during baking, the state of the aluminum compound, the shape controlling agent, and the molybdenum compound is not particularly limited as long as they are present in the same space so that the molybdenum compound and the shape controlling agent can act on the aluminum compound. Specifically, simple mixing in which powders of the molybdenum compound, the shape controlling agent, and the aluminum compound are mixed, mechanical mixing using a pulverizer or the like, or mixing using a mortar or the like may be used, or mixing in a dry state or a wet state may be used.

The condition of baking temperature is not particularly limited, and is appropriately determined according to the mean particle size and aspect ratio of the target plate-like alumina particles, the formation of the germanium or germanium compound in the plate-like alumina particles, the dispersibility thereof, and the like. In general, for the temperature in baking, the highest temperature is preferably 900° C., which is the decomposition temperature of aluminum molybdate ($Al_2(MoO_4)_3$), or higher, and is more preferably 1000° C. or higher at which the germanium or germanium compound is formed at a high efficiency.

In general, for controlling the shape of α-alumina obtained after baking, the baking has to be performed at a high temperature of 2000° C., which is close to the melting point of α-alumina, or higher. However, there are considerable problems for industrial application in points of the load on a baking furnace and the cost of combustion.

The production method of the present invention can be implemented even at a high temperature exceeding 2000° C., but even at 1600° C. or lower which is a significantly lower than the melting point of α-alumina, α-alumina that has a high alpha crystallization ratio and has a plate-like shape of a high aspect ratio, can be formed regardless of the shape of the precursor.

According to an embodiment of the present invention, even under a condition of the highest baking temperature of 900 to 1600° C., plate-like alumina particles which have a high aspect ratio and an alpha crystallization ratio of 90% or more can be efficiently formed at a low cost, and baking at a highest temperature of 950 to 1500° C. is more preferred, and baking at a highest temperature in the range of 1000 to 1400° C. is most preferred.

Regarding the time period in baking, it is preferred that the temperature is risen to a predetermined highest temperature over 15 minutes to 10 hours and is retained at the highest temperature for baking for 5 minutes to 30 hours. For efficiently forming the plate-like alumina particles, the retention time for baking is more preferably about 10 minutes to 15 hours.

By selecting the conditions of a highest temperature of 1000 to 1400° C. and a retention time for baking of 10 minutes to 15 hours, polygonal plate-like alumina particles having a dense α crystal form is easily obtained with less occurrence of aggregation.

The atmosphere in baking is not particularly limited as long as the effect of the present invention can be achieved, and, for example, is preferably an oxygen-containing atmosphere, such as in the air or oxygen, or an inert atmosphere, such as in nitrogen, argon, or carbon dioxide, and in view of the cost, the air atmosphere is more preferred.

The apparatus for baking is not necessarily limited, and a so-called baking furnace can be used. The baking furnace is preferably made of a material that is not reacted with sublimed molybdenum oxide, and for efficiently utilizing molybdenum oxide, a highly airtight baking furnace is preferably used.

[Molybdenum Removal Step]

The method of producing plate-like alumina particles may further include a molybdenum removal step for removing at least a part of molybdenum, as required, after the baking step.

Since the baking is accompanied with sublimation of molybdenum as described above, by controlling the baking time, baking temperature, or the like, the molybdenum content in the surface layer of the plate-like alumina particles can be controlled and the molybdenum content in the portion other than the surface layer (inner layer) of the alumina particles and the state of existence of molybdenum can also be controlled.

Molybdenum can be deposited on the surface of the plate-like alumina particles. As a means other than the sublimation described above, the molybdenum can be removed by washing with water, an aqueous ammonia solution, an aqueous sodium hydroxide solution, or an aqueous acidic solution. Note that, although the molybdenum may not be removed from the plate-like alumina particles, at least molybdenum in the surface is preferably removed since the properties inherent in the alumina is fully exhibited and disadvantages due to the molybdenum present in the surface do not appear when, for example, the alumina particles are used in a dispersion in a dispersion medium based on various binders.

In this case, the molybdenum content can be controlled by appropriately varying the concentration and amount of the water, aqueous ammonia solution, aqueous sodium hydroxide solution, aqueous acidic solution used, the washed portion, the washing time, and the like.

[Pulverization Step]

The baked product does sometimes not fall in the range of the particle size suitable for the present invention due to aggregation of the plate-like alumina particles. Thus, the plate-like alumina particles may be pulverized, as required, so as to fall in the range of the particle size suitable for the present invention.

The method of pulverizing the baked product is not particularly limited, and a conventionally known pulverization method, such as a ball mill, jaw crusher, jet mill, disc mill, spectrum mill, grinder, or mixer mill, can be applied.

[Classification Step]

The plate-like alumina particles are preferably subjected to a classification treatment for adjusting the mean particle size, increasing the flowability of the powder, or suppressing increase in the viscosity when blended into a binder to form a matrix. The "classification treatment" means an operation for dividing particles into groups according to the size of the particles.

The classification may be a wet system or a dry system, and from the viewpoint of the productivity, a dry system classification is preferred.

Examples of the dry system classification include classification by a sieve and wind force classification based on the difference between the centrifugal force and the fluid resistance. From the viewpoint of the precision of the classification, the wind force classification is preferred and can be performed using a classifier, such as an air flow classifier which utilizes the Coanda effect, a swirling air flow type classifier, a forced vortex type centrifugal classifier, or a semifree vortex centrifugal classifier.

The pulverization step and the classification step described above can be performed at a required stage including before or after an organic compound layer formation step described later. The mean particle size, for example, of the resulting plate-like alumina particles can be adjusted by whether the pulverization or classification is applied, or selecting the conditions therein.

The plate-like alumina particles of the present invention or the plate-like alumina particles obtained by the production method of the present invention preferably undergo little or no aggregation since such plate-like alumina particles are likely to exhibit the inherent properties, are even superior in handleability of themselves, and are even superior in dispersibility when used in a dispersion in a dispersion medium. In the method of producing plate-like alumina particles, it is preferred that particles with less or no aggregation are obtained without the pulverization step and the classification step described above since the target plate-like alumina having excellent properties can be produced with high productivity with no need of the steps described left.

[Organic Compound Layer Formation Step]

In an embodiment, the method of producing plate-like alumina particles may further contain an organic compound layer formation step. The organic compound layer formation step is typically performed after the baking step or after the molybdenum removal step.

The method for forming an organic compound layer is not particularly limited, and a known method may be appropriately used. An example is a method in which a liquid containing an organic compound is brought into contact with plate-like alumina particles containing molybdenum, followed by drying.

Note that the organic compounds described above can be used as the organic compound that can be used for forming an organic compound layer.

EXAMPLES

Next, the present invention will be described in more detail with reference to examples, but the present invention is not to be limited to the examples.
<<Production of Plate-like Alumina Particles>>

Example 1

In a mortar, 145.3 g of aluminum hydroxide (manufactured by Nippon Light Metal Company, Ltd., mean particle size: 10 μm) and 1.43 g of germanium dioxide (manufactured by Mitsubishi Materials Corporation), and 5.0 g of molybdenum trioxide (manufactured by Taiyo Koko, Co., Ltd.) were mixed to obtain a mixture. The resulting mixture was placed in a crucible, the temperature was increased in a ceramic electric furnace with a condition of 5° C./minute to 1100° C. and was held at 1100° C. for 10 hours to perform baking. Then, the temperature was decreased with a condition of 5° C./minute to a room temperature, and then the crucible was taken out to obtain 97.0 g of a pale blue powder. The resulting powder was pulverized in a mortar until the powder was allowed to pass through a 106 μm sieve.

Subsequently, 97.0 g of the resulting pale blue powder was dispersed in 150 mL of 0.5% aqueous ammonia, the dispersion was stirred at a room temperature (25 to 30° C.) for 0.5 hours. Then, the aqueous ammonia was removed by filtration, and washing with water and drying were performed to remove molybdenum remaining on the particle surface, thereby obtaining 94.0 g of a pale blue powder. It was found from a SEM observation that the resulting powder was particles having a plate-like shape that had a polygonal plate-like shape with quite little aggregation and had superior handleability. Furthermore, in an XRD measurement, there appeared a sharp peak scattering attributable to α-alumina and no alumina crystal-based peak other than the peak of the α crystal structure was observed, which suggested that the powder was plate-like alumina having a dense crystal structure. Furthermore, it was found from results of a fluorescent X-ray quantitative analysis that the resulting particles contained 1.30% of molybdenum in terms of molybdenum trioxide.

Example 2

The same operation was performed as in Example 1 except that 145.3 g of aluminum hydroxide (manufactured by Nippon Light Metal Company, Ltd., mean particle size: 10 μm), 2.85 g of germanium dioxide, and 5.0 g of molybdenum trioxide (manufactured by Taiyo Koko, Co., Ltd.) were mixed in a mortar, thereby obtaining 96.0 g of a white powder.

It was found from a SEM observation that the resulting powder was plate-like shape particles that had a polygonal plate-like shape with quite little aggregation and had superior handleability. Furthermore, in an XRD measurement, there appeared a sharp peak scattering attributable to α-alumina and no alumina crystal-based peak other than the peak of the α crystal structure was observed, which suggested that the powder was plate-like alumina having a dense crystal structure. Furthermore, it was found from results of a fluorescent X-ray quantitative analysis that the resulting particles contained 0.62% of molybdenum in terms of molybdenum trioxide.

Example 3

The same operation was performed as in Example 1 except that 122.3 g of aluminum hydroxide (manufactured by Nippon Light Metal Company, Ltd., mean particle size: 10 μm), 2.4 g of germanium dioxide, and 20 g of molybdenum trioxide were mixed in a mortar, thereby obtaining 79.0 g of a pale blue powder. It was found from a SEM observation that the resulting powder was plate-like shape particles that had a polygonal plate-like shape with quite little aggregation and had superior handleability. Furthermore, in an XRD measurement, there appeared a sharp peak scattering attributable to α-alumina and no alumina crystal-based peak other than the peak of the α crystal structure was observed, which suggested that the powder was plate-like alumina having a dense crystal structure. Furthermore, it was found from results of a fluorescent X-ray quantitative analysis that the resulting particles contained 0.92% of molybdenum in terms of molybdenum trioxide.

Example 4

The same operation was performed as in Example 1 except that 91.7 g of aluminum hydroxide (manufactured by Nippon Light Metal Company, Ltd., mean particle size: 10 μm), 1.8 g of germanium dioxide, and 40 g of molybdenum trioxide were mixed in a mortar, thereby obtaining 59.0 g of a blue powder. It was found from a SEM observation that the resulting powder was plate-like shape particles that had a polygonal plate-like shape with quite little aggregation and had superior handleability. Furthermore, in an XRD measurement, there appeared a sharp peak scattering attributable to α-alumina and no alumina crystal-based peak other than the peak of the α crystal structure was observed, which suggested that the powder was plate-like alumina having a dense crystal structure. Furthermore, it was found from results of a fluorescent X-ray quantitative analysis that the resulting particles contained 1.13% of molybdenum in terms of molybdenum trioxide.

Example 5

The same operation was performed as in Example 1 except that 145.3 g of aluminum hydroxide (manufactured by Nippon Light Metal Company, Ltd., mean particle size: 10 μm), 2.85 g of germanium dioxide, 5 g of molybdenum trioxide, and 0.5 g of potassium carbonate were mixed in a mortar, thereby obtaining 95.0 g of a white powder. It was found from a SEM observation that the resulting powder was plate-like shape particles that had a polygonal plate-like shape with quite little aggregation and had superior handleability. Furthermore, in an XRD measurement, there appeared a sharp peak scattering attributable to α-alumina and no alumina crystal-based peak other than the peak of the α crystal structure was observed, which suggested that the powder was plate-like alumina having a dense crystal structure. Furthermore, it was found from results of a fluorescent X-ray quantitative analysis that the resulting particles contained 0.40% of molybdenum in terms of molybdenum trioxide.

Example 6

The same operation was performed as in Example 1 except that 145.3 g of aluminum hydroxide (manufactured by Nippon Light Metal Company, Ltd., mean particle size: 10 μm), 4.75 g of germanium dioxide, and 5 g of molybdenum trioxide were mixed in a mortar, thereby obtaining 98.0 g of a white powder. It was found from a SEM observation that the resulting powder was plate-like shape particles that had a polygonal plate-like shape with quite little aggregation and had superior handleability. Furthermore, in an XRD measurement, there appeared a sharp peak scattering attributable to α-alumina and no alumina crystal-based peak other than the peak of the α crystal structure was observed, which suggested that the powder was plate-like alumina having a dense crystal structure. Furthermore, it was found from results of a fluorescent X-ray quantitative analysis that the resulting particles contained 0.37% of molybdenum in terms of molybdenum trioxide.

In the plate-like alumina particles of Example 5 which was produced using a potassium compound in combination, molybdenum which could exist in the surface of the particles was removed by washing with aqueous ammonia, thus molybdenum existed only inside the particles. Potassium molybdate which could be produced by baking was removed by washing with water since potassium molybdate is itself soluble in water.

Comparative Example 1

A commercially available plate-like alumina (Serath manufactured by Kinsei Matec, Co., Ltd) was subjected to evaluations.

Comparative Example 2

In a mortar, 77.0 g of aluminum hydroxide (manufactured by Nippon Light Metal Company, Ltd., mean particle size: 10 μm), 0.1 g of silicon dioxide (Special grade, manufactured by Kanto Chemical Co., Inc.), and 50.0 g of molybdenum trioxide (manufactured by Taiyo Koko, Co., Ltd.) were mixed to obtain a mixture. The resulting mixture was placed in a crucible, and baking was performed in a ceramic electric furnace at 1100° C. for 10 hours. After decreasing the temperature, the crucible was taken out to obtain 52 g of a pale blue powder. The resulting powder was pulverized in a mortar until the powder was allowed to pass through a 106 μm sieve.

Subsequently, 52.0 g of the resulting pale blue powder was dispersed in 150 mL of 0.5% aqueous ammonia, and the dispersion was stirred at a room temperature (25 to 30° C.) for 0.5 hours. Then, the aqueous ammonia was removed by filtration, and washing with water and drying were performed to remove molybdenum remaining on the particle surface to thereby obtain 51.2 g of a blue powder.

In an XRD measurement, there appeared a sharp peak scattering attributable to α-alumina and no alumina crystal-based peak other than the peak of the α crystal structure was observed, which suggested that the powder was plate-like alumina having a dense crystal structure. Furthermore, it was found from results of a fluorescent X-ray quantitative analysis that the resulting particles contained 1.39% of molybdenum in terms of molybdenum trioxide.

Comparative Example 2 is an example corresponding to Example 1 of JP-A-2016-222501 which is mentioned above as PTL 5.

<<Evaluations>>

Samples of the powders produced in Examples 1 to 6 and Comparative Examples 1 to 2 described above were subjected to the following evaluations. The measurement methods will be shown below.

[Measurement of Major Axis L of Plate-Like Alumina]

The mean particle size d50 (μm) was determined using a laser diffraction particle size distribution analyzer, HELOS (H3355) & RODOS, R3: 0.5/0.9-175 μm (manufactured by Japan Laser Corp) under conditions of a dispersion pressure of 3 bar and a suction pressure of 90 mbar, and the d50 was taken as the major axis L.

[Measurement of Thickness D of Plate-Like Alumina]

The thicknesses of 50 particles were measured using a scanning electron microscope (SEM) and the average thereof was taken as the thickness D (μm).

[Aspect Ratio L/D]

The aspect ratio was determined by the following formula.

$$\text{Aspect ratio} = \text{Major axis } L \text{ of plate-like alumina} / \text{Thickness } D \text{ of plate-like alumina}$$

[XRD Analysis]

The same operation was performed as in Example 1 except that 143.5 g of aluminum hydroxide, 4.75 g of germanium dioxide, and 5 g of molybdenum trioxide were mixed in a mortar, thereby obtaining 98 g of a white powder.

The produced sample was placed on a measurement sample holder with a depth of 0.5 mm and was packed therein with a constant load so as to give a flat surface. The sample in the holder was set in a wide angle X-ray diffraction (XRD) device (Rint-Ultma manufactured by Rigaku Corporation) and was subjected to a measurement under the following conditions: Cu/Kα ray, 40 kV/30 mA, scan speed: 2 degrees/minute, scanning range: 10 to 70 degrees.

The peak of the germanium compound (germanium dioxide) seen in 2θ=26.05±0.2 degrees was observed.

[Analysis of Amount of Ge in Surface Layer of Plate-Like Alumina Particles]

The produced sample was press-fixed on a double sided tape and was subjected to a composition analysis using an X-ray photoelectron spectroscopy (XPS) device, Quantera SNM (ULVAC-PHI, Inc.), under the following conditions.

X-Ray source: monochromatic AlKα, beam diameter: 100 μmϕ, output: 25 W
Measurement: area measurement (1000 μm square), n=3
Charge correction: C1s=284.8 eV The [Ge]/[Al] obtained from the result of the XPS analysis was taken as the amount of Ge in the surface layer of the plate-like alumina particles.

[Analysis of Amount of Ge Contained in Plate-Like Alumina Particles]

About 70 mg of the produced sample was taken on a filter paper, was covered with a PP film, and was then subjected to a composition analysis using a fluorescent X-ray (XRF) analyzer, Primus IV (manufactured by Rigaku Corporation).

The [Ge]/[Al] obtained from the result of the XRF analysis was taken as the amount of Ge in the plate-like alumina particles.

The amount of germanium obtained from the result of the XRF analysis was determined in terms of germanium dioxide (% by mass) relative to 100% by mass of the plate-like alumina particles.

[Analysis of Amount of Mo Contained in Plate-Like Alumina]

About 70 mg of the produced sample was placed on a filter paper, was covered with a PP film, and was then subjected to a composition analysis using a fluorescent X-ray analyzer, Primus IV (manufactured by Rigaku Corporation).

The amount of molybdenum obtained from the result of the XRF analysis was determined in terms of molybdenum trioxide (% by mass) relative to 100% by mass of the plate-like alumina particles.

[Measurement of Density]

The produced sample was subjected to a pretreatment under conditions at 300° C. for 3 hours, and then the density was measured using a dry system automatic density analyzer, AccuPyc II 1330, manufactured by Micromeritics Instrument Corporation under conditions at a measurement temperature of 25° C. with helium as a carrier gas.

[Measurement of Isoelectric Point]

The zeta potential was measured with a zeta potential analyzer (Zetasizer Nano ZSP manufactured by Malvern Panalytical Ltd.). Using an Awatori Neritaro (ARE-310 manufactured by Thinky Corporation), 20 mg of a sample and 10 mL of a 10 mM aqueous KCl solution were stirred in the stirring-defoaming mode for 3 minutes and the mixture was allowed to stand for 5 minutes, and the supernatant was taken as a sample for measurement. The sample with 0.1 N HCl added thereto was subjected to a zeta potential measurement with an automatic titer in the range to pH=2 (applied voltage: 100 V, Monomodl mode) to evaluate the pH at the isoelectric point at which the potential was zero.

[Evaluation of Amount of Wear]

The produced sample was melt-mixed with a PPS resin (LR-100 G manufactured by DIC Corporation) so as to give a filler content of 40% by volume under conditions at 300° C. for 10 minutes to obtain a molded article of 70 mm×110 mm×2 mm thickness. The molded article was cut into a size of 10 mm×10 mm×2 mm to obtain a sample piece. Using the sample piece, an alloy tool steel cutter (SKS 2) in which a depth of 80 μm in the direction perpendicular to the blade surface was exposed was pressed with a load of 1 kg against a surface of 10 mm×10 mm of the sample piece so that the blade of the cutter was in vertical contact to the surface. The blade was allowed to rub the sample piece 1000 strokes under conditions of a moving distance in a stroke of 100 mm and at 75 mm/s, and then the depth of the blade was measured. The ratio of the depth to the initial depth (80 μm) was determined and was taken as the retention rate %. The larger the amount of wear is, the smaller the retention rate.

[Analysis of Alpha Crystallization Ratio]

The produced sample was placed on a measurement sample holder with a depth of 0.5 mm and was packed therein with a constant load so as to give a flat surface. The sample in the holder was set in a wide angle X-ray diffraction (XRD) device (Rint-Ultma manufactured by Rigaku Corporation) and was subjected to a measurement under the following conditions: Cu/Kα ray, 40 kV/30 mA, scan speed: 2 degrees/minute, scanning range: 10 to 70 degrees. The alpha crystallization ratio was determined from a ratio of the highest peak height of the α-alumina to that of the transition alumina.

Table 1 shows the formulation in terms of oxides of raw material compounds (with the total amount taken as 100% by mass) and the results of the above evaluations.

TABLE 1

| | In terms of oxide | Example 1 | Example 2 | Example 3 | Example 4 | Example 5 | Example 6 | Comparative Example 1 | Comparative Example 2 |
|---|---|---|---|---|---|---|---|---|---|
| Formulation | $Al_2O_3$ | 93.7 | 92.4 | 78.1 | 58.9 | 92.1 | 90.7 | — | 50.1 |
| | $MoO_3$ | 4.9 | 4.8 | 19.5 | 39.3 | 4.8 | 4.8 | — | 49.8 |
| | $GeO_3$ | 1.4 | 2.8 | 2.4 | 1.8 | 2.8 | 4.5 | — | 0.0 |
| | $SiO_2$ | 0.0 | 0.0 | 0.0 | 0.0 | 0.0 | 0.0 | — | 0.1 |
| | $K_2O$ | 0.0 | 0.0 | 0.0 | 0.0 | 0.3 | 0.0 | — | 0.0 |
| L (μm) | | 13.0 | 12.7 | 14.6 | 18.6 | 13.2 | 12.5 | 1.7 | 10.1 |
| D (μm) | | 0.7 | 0.5 | 0.5 | 0.6 | 0.7 | 0.5 | 0.5 | 0.5 |
| Aspect ratio L/D | | 19 | 25 | 29 | 31 | 19 | 25 | 15 | 20 |
| XPS molar ratio [Ge]/[Al] | | 0.109 | 0.115 | 0.122 | 0.135 | 0.129 | 0.121 | N.D. | N.D. |
| XRF molar ratio [Ge]/[Al] | | 0.007 | 0.017 | 0.018 | 0.020 | 0.015 | 0.028 | N.D. | N.D. |
| XRF $GeO_2$ (mass %) | | 1.12 | 2.67 | 2.70 | 2.76 | 2.72 | 4.40 | N.D. | N.D. |
| XRF $MoO_3$ (mass %) | | 1.30 | 0.62 | 0.92 | 1.13 | 0.40 | 0.37 | N.D. | 1.39 |
| Density (g/cm³) | | 4.00 | 4.01 | 4.01 | 4.02 | 4.01 | 4.03 | 3.94 | 3.99 |
| pH at isoelectric point | | 3.7 | 2.8 | 3.0 | 3.1 | 3.1 | 3.1 | 4.4 | 5.3 |
| Wear (retention rate %) | | 42 | 58 | 60 | 62 | 60 | 60 | 25 | 28 |

FIG. 1 shows SEM images of alumina particles of Example 1, Example 2, and Example 6.

It was found that the powders obtained in Examples 1 to 6 and Comparative Examples 1 to 2 each had a thickness, a mean particle size, and an aspect ratio shown in Table 1 above.

In addition, the alpha crystallization ratio was measured, and it was found that the resulting powders in Examples 1 to 6 and Comparative Examples 1 to 2 each had an alpha crystallization ratio of 90% or more.

In addition, the existence of germanium dioxide which is a Ge compound was observed in the XRD analysis.

In addition, in comparison in the peak in the spectrum in the $2p_{3/2}$ region of the Ge compound in the XPS analysis, a high peak with a [Ge]/[Al] value of 0.08 or more was observed in the range of binding energy of 1220±1.5 eV, which indicated the detection of germanium dioxide, in the resulting powders of Examples 1 to 6.

In addition, in the resulting powder of Comparative Examples 1 to 2, no peak was observed in the range of binding energy of 1220±1.5 eV.

As can be seen in the comparison between Examples 1 to 6 and Comparative Examples 1 to 2, the plate-like alumina particles of Examples 1 to 6 which contained germanium or a germanium compound in the surface layer show a smaller amount of wear of wearing the blade than the alumina particles of Comparative Examples 1 to 2 which contained no germanium or germanium compound in the surface layer.

In addition, as can be seen with reference to Examples 1 to 6, particles having a higher value of the XPS molar ratio [Ge]/[Al] show a smaller amount of wear of wearing the blade and have an even superior effect of preventing wear.

With a focus on the values of the XRF molar ratio [Ge]/[Al], it can be seen that, as the amount of the raw material $GeO_2$ charged is increased from Example 1 to Example 6, the value of [Ge]/[Al] measured by XRF increases and the amount of the germanium or germanium compound increases.

In contrast, with a focus on the values of the XPS molar ratio [Ge]/[Al], it can be seen that, even if the amount of the raw material $GeO_2$ charged is increased from Example 1 to Example 6, the value reaches a plateau at a certain level. This is considered to be attributable to the fact that the XRF analyses the entire sample whereas the XPS analyses several nanometers of the sample surface. That is, no increase in the value of the XPS molar ratio [Ge]/[Al] means that the amount of Ge in the plate-like alumina particle surface reaches a saturated state, and it is considered that the surface layer of the plate-like alumina particles here is in the state where the entire particles are coated with the germanium or germanium compound.

As can be seen with reference to Examples 2 to 4, when the amount of the raw material $MoO_3$ charged is increased, the value of XPS molar ratio [Ge]/[Al] is higher than that in Example 2 and that the effect of preventing wear is also superior.

Similarly, in comparison between Example 2 and Example 5, it can be seen that, by adding $K_2O$ in Example 5, the value of XPS molar ratio [Ge]/[Al] is higher than that in Example 2 and the effect of preventing wear is also superior.

It is considered from these results that, when the amount of $MoO_3$ used as a flux agent is increased or $K_2O$ is added, the diffusion of Ge by the flux agent is achieved more efficiently and thus the produced plate-like alumina particles have a high value of XPS molar ratio [Ge]/[Al], resulting in an even superior effect of preventing wear.

INDUSTRIAL APPLICABILITY

The plate-like alumina particles of the present invention, which contain germanium or a germanium compound, have a lower hardness than conventional plate-like alumina particles and are less likely to wear apparatuses.

Accordingly, the plate-like alumina particles can be applied to any known common application, such as, for example, a thermal conductive filler.

The invention claimed is:

1. Plate-like alumina particles comprising germanium or a germanium compound, wherein the plate-like alumina particles comprise the germanium or germanium compound in a surface layer; and the plate-like alumina particles having a molar ratio of Ge to Al, Ge/Al, of 0.08 or more as determined in an XPS analysis.

2. The plate-like alumina particles according to claim 1, wherein the plate-like alumina particles have a density of 3.7 $g/cm^3$ or more and 4.1 $g/cm^3$ or less.

3. The plate-like alumina particles according to claim 1, wherein the plate-like alumina particles have a molar ratio of Ge to Al, Ge/Al, of 0.08 or less as determined in an XRF analysis.

4. The plate-like alumina particles according to claim 1, wherein the plate-like alumina particles have a thickness of 0.01 to 5 µm, a mean particle size of 0.1 to 500 µm, and an aspect ratio of 2 to 500.

5. The plate-like alumina particles according to claim 1, wherein the plate-like alumina particles further comprise molybdenum.

6. The plate-like alumina particles according to claim 5, wherein the plate-like alumina particles have a pH of 2 to 6 at an isoelectric point which gives a potential of zero in a zeta potential measurement.

7. A method of producing the plate-like alumina particles according to claim 6, the method comprising mixing a molybdenum compound, a raw material germanium compound, and an aluminum compound to prepare a mixture, and baking the mixture.

8. The method of producing the plate-like alumina particles according to claim 7, wherein the mixture further contains a potassium compound.

* * * * *